United States Patent
Matsunami et al.

(10) Patent No.: US 7,939,204 B2
(45) Date of Patent: May 10, 2011

(54) SEPARATOR FOR LEAD-ACID BATTERY

(75) Inventors: Yoshiaki Matsunami, Tokyo (JP);
Shuhei Nagakubo, Tokyo (JP); Takashi Shidomi, Tokyo (JP); Masaki Kita, Kyoto (JP); Junpei Yamashita, Kyoto (JP)

(73) Assignees: Nippon Sheet Glass Company, Limited, Tokyo (JP); GS Yuasa Corporation, Kyoto-shi (JP)

( * ) Notice: Subject to any disclaimer, the term of this patent is extended or adjusted under 35 U.S.C. 154(b) by 1085 days.

(21) Appl. No.: 10/589,961

(22) PCT Filed: Feb. 24, 2005

(86) PCT No.: PCT/JP2005/003041
§ 371 (c)(1),
(2), (4) Date: Aug. 18, 2006

(87) PCT Pub. No.: WO2005/083816
PCT Pub. Date: Sep. 9, 2005

(65) Prior Publication Data
US 2007/0190426 A1    Aug. 16, 2007

(30) Foreign Application Priority Data
Feb. 27, 2004    (JP) .................................. 2004-055476

(51) Int. Cl.
*H01M 2/16* (2006.01)
(52) U.S. Cl. ..................... 429/247; 429/250; 429/251
(58) Field of Classification Search ........... 429/427–251
See application file for complete search history.

(56) References Cited

U.S. PATENT DOCUMENTS 5,462,820 A    10/1995 Tanaka ......................... 429/174
6,361,865 B1 *  3/2002 Tsuda et al. .................. 428/412

FOREIGN PATENT DOCUMENTS

| EP | 0 507 090 A1 | 10/1992 |
| JP | 59-211959 | 11/1984 |
| JP | 4-296447 | 10/1992 |

(Continued)

OTHER PUBLICATIONS

Supplementary European Search Report dated Sep. 3, 2007.

(Continued)

*Primary Examiner* — Karie O'Neill Apicella
(74) *Attorney, Agent, or Firm* — Kratz, Quintos & Hanson, LLP

(57) ABSTRACT

A separator for a lead-acid battery enabling the lead acid battery to infallibly have a predetermined capacity after the initial charging and a prolonged service life by limiting the maximum quantity of reducing substance liberated or produced from the separator at or below a given level.

The separator for a lead-acid battery comprising a porous membrane made mainly from a polyolefin resin, an inorganic powder and a mineral oil and containing a surface active agent as an auxiliary material, characterized in that the amount of any reducing substance liberated or eluted after 24 hours of electrolysis carried out at about 25° C. with a direct current of 1.2 A by using an electrolytic cell composed of the porous membrane, a positive electrode, a negative electrode and diluted sulfuric acid is 1.0 ml or less per 100 $cm^2$ when calculated from the consumption of a (1/100)N potassium permanganate solution per 100 $cm^2$ of the porous membrane.

7 Claims, 2 Drawing Sheets

FOREIGN PATENT DOCUMENTS

| | | |
|---|---|---|
| JP | 2001-283820 | 10/2001 |
| JP | 2003-109567 | 4/2003 |
| JP | 2003-297679 | 10/2003 |
| WO | WO 94/20995 | 9/1994 |
| WO | WO 9420995 * | 9/1994 |

OTHER PUBLICATIONS

Office Action issued on May 8, 2009 in the corresponding Chinese patent application No. 200580005820.9 with English translation.

* cited by examiner

US 7,939,204 B2

SEPARATOR FOR LEAD-ACID BATTERY

This application is a continuation of International Application No. PCT/JP2005/3041, filed Feb. 24, 2005, which claims priority to Japan Patent Application No. 2004-055476, filed on Feb. 27, 2004. The disclosures of the prior applications are herein incorporated by reference in their entireties.

TECHNICAL FIELD

The present invention relates to a separator for a lead-acid battery.

BACKGROUND OF THE INVENTION

The lead-acid battery which is widely used as a starting battery for an automobile comprises a positive electrode holding lead dioxide, a negative electrode holding spongy lead, both held by a grid-like power collector made of lead or a lead alloy, and a separator inserted between electrodes for isolating them from each other, the electrodes and separator being held in a cell container filled with diluted sulfuric acid serving as the electrolyte.

Referring to the separator for a lead-acid battery, there are, for example, a separator composed of a sheet made from linter pulp in a wet process and cured with a phenolic resin and a glass mat bonded thereto, a separator composed of a sheet made from synthetic pulp, an inorganic powder and glass fibers in a wet process and a glass mat bonded thereto and a synthetic resin separator having ribs extrusion molded from a polyethylene resin and an inorganic powder.

The currently available separators for lead-acid batteries are mainly of the polyethylene resin type for several reasons, for example, (a) since the separator can be sealed at its both ends in a way forming an envelope by two pair of gears, thereby making it possible to assemble a battery quickly, and (b) since the projections in the shape of rib can be formed during resin molding, thereby eliminating the necessity for any expensive glass mat.

While the polyethylene resin separator has the advantages as stated above, it has essentially required a surface active agent improving its wetting property with the electrolyte, since it is mainly composed of a polyethylene resin. Particularly, with the polyethylene resin separator having projections in the shape of rib and no glass mat, the gas rising from the positive electrode in the overcharged state of the battery makes it relatively easy for the surface active agent to be eluted from the separator into the electrolyte and thereby cause the problems as stated below:

(1) The battery fails to have a predetermined capacity in its initial charged state, though rarely, since the surface active agent liberated or eluted from the separator acts as a reducing substance to inhibit the activation (oxidation-reduction reactions) of the positive and negative electrodes during the initial charging of the battery as the battery has its interior exposed to a high temperature and an oxidizing atmosphere during its initial charging (formation).

(2) As the lead-acid battery has an increasing tendency to be used in a high temperature and overcharged atmosphere, (a) the simultaneous occurrence of the evaporation of the electrolyte and the electrolysis of water brings about an increased loss of the electrolyte and makes the cell joints more likely to be exposed from the electrolyte, and (b) the reducing substance liberated or produced from the separator is changed by the oxidizing power in the battery into an organic acid having a lead solubility (for example, a volatile organic acid, such as acetic acid), and the organic acid causes corrosion in the battery and a reduction in cross-sectional area of the welded cell joints, resulting in a lower power collecting efficiency, and the battery has its high-efficiency discharge performance lowered, fails to produce a high-current discharge as required when starting the vehicle and tends to have a shortened life.

SUMMARY OF THE INVENTION

As a result of our extensive study, we, the inventors of the invention, have found that the corrosion caused by an organic acid originating from the reducing substance liberated or produced from the separator is likely to occur at any portion welded by post-processing, such as the cell joints, and particularly when any such portion is exposed from the electrolyte into the gas phase as a result of e.g. its loss.

As regards the reason why corrosion is likely to occur at any post-welded portion, it is presumed that the post-welded portion may be likely to have interstitial corrosion caused by the cracks or voids formed in the welded surfaces, and that such interstitial corrosion may be accelerated by the presence of an organic acid. The elimination of welding from the battery manufacturing process makes it possible to prevent such interstitial corrosion completely, but that is not a realistic solution at the present time.

It is, therefore, an object of the invention to provide a separator for a lead-acid battery which can keep its maximum liberation or formation of any reducing substance at or below a certain level to ensure a predetermined capacity for the battery upon its initial charging and prolong its life.

In order to attain the above object, according to claim 1 of the present invention, the separator for a lead-acid battery according to the invention is a porous membrane made mainly from a polyolefin resin, an inorganic powder and a mineral oil and containing a surface active agent as an auxiliary material, characterized in that the amount of any reducing substance liberated or eluted after 24 hours of electrolysis carried out at about 25° C. with a direct current of 1.2 A by using an electrolytic cell composed of the porous membrane, a positive electrode, a negative electrode and diluted sulfuric acid is 1.0 ml or less per 100 $cm^2$ when calculated from the consumption of a (1/100)N potassium permanganate solution per 100 $cm^2$ of the porous membrane.

According to claim 2 of the separator for a lead-acid battery, in addition to the feature of claim 1, the amount of the reducing substance is 0.7 ml or less per 100 $cm^2$ when calculated from the consumption of a (1/100)N potassium permanganate solution per 100 $cm^2$ of the porous membrane.

DETAILED DESCRIPTION OF THE INVENTION

Figure 1:
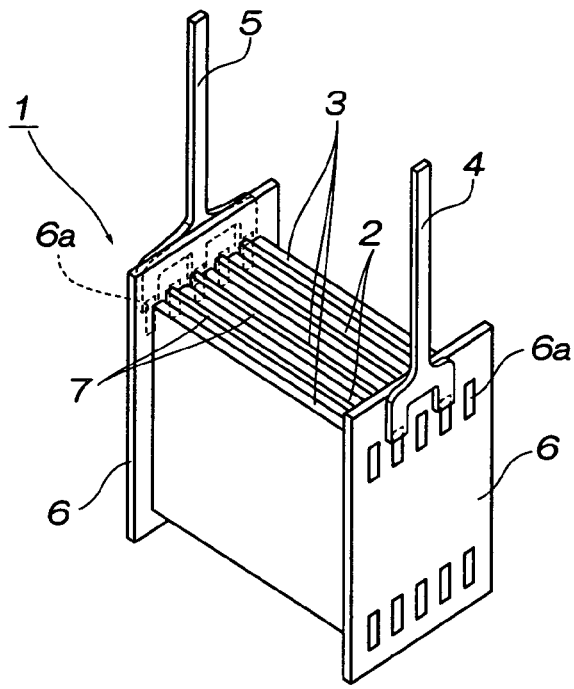
FIG. 1 is a diagram illustrating an electrolytic plate group employed for the determination of the amount of any reducing substance according to the invention.

The separator for a lead-acid battery according to the invention is a porous membrane made mainly from a polyolefin resin, an inorganic powder and a mineral oil and containing a surface active agent as an auxiliary material, so that the amount of any reducing substance liberated or eluted in dilute sulfuric acid after 24 hours of electrolysis carried out at about 25° C. with a direct current of 1.2 A by using an electrolytic cell composed of the porous membrane, a positive electrode, a negative electrode and diluted sulfuric acid may be 1.0 ml or less per 100 cm$^2$ when calculated from the consumption of a (1/100)N potassium permanganate solution per 100 cm$^2$ of the porous membrane.

Although it may be ideal to determine the quantity of the surface active agent directly as an indicator of the amount of the reducing substance liberated or formed from the separator for a lead-acid battery in its electrolyte, it has been necessary to employ a different method for qualitative or quantitative analysis in accordance with the surface active agent employed and it has been difficult to determine the quantity of the surface active agent contained in the diluted sulfuric acid electrolyte.

According to the invention, the reducing substance originating from the surface active agent eluted from the separator into the electrolyte by electrolytic method is titrated with a potassium permanganate solution as an oxidizing agent, so that the amount of the reducing substance liberated or eluted from the separator may be estimated from the consumption of a (1/100)N potassium permanganate solution per 100 cm$^2$ of the porous membrane.

When the electrolyte is titrated with the (1/100)N potassium permanganate solution, a transition metal ion changing in valence easily and inhibiting an active material during the initial charging of the battery is, for example, detected with the surface active agent and should any transition metal be included in the materials for the separator or during its manufacture, the transition metal can be detected as a reducing substance with the surface active agent. Thus, we have found that the estimation of the amount of the reducing substance from the consumption of the (1/100)N potassium permanganate solution per 100 cm$^2$ of the porous membrane makes it possible to detect the total amount of the surface active agent and transition metal which disable the battery to ensure a predetermined capacity and is the best way to evaluate the battery for its stability in capacity after its initial charging.

For the reasons stated above, the invention forms a separator for a lead-acid battery so that the amount of any reducing substance originating from e.g. the surface active agent liberated or eluted in diluted sulfuric acid as a result of electrolysis in an electrolytic cell composed of a porous-membrane separator for a lead-acid battery, a positive electrode, a negative electrode and diluted sulfuric acid may be estimated from the consumption of a (1/100)N potassium permanganate solution and may be 1.0 ml or less per 100 cm$^2$ when calculated from the consumption of the (1/100)N potassium permanganate solution per 100 cm$^2$ of the porous membrane, whereby it is possible to achieve a stable battery capacity without having the activation (oxidation-reduction reactions) of the positive and negative electrodes inhibited during the initial charging (formation) of the battery, restrain any corrosion of the welded portions, such as the cell joints, and thereby prevent any lowering of the power collecting efficiency of the battery and realize a prolonged battery life even in a high-temperature atmosphere.

The polyolefin resin forming one of the principal materials for the separator for a lead-acid battery may be, for example, a polyethylene or polypropylene resin having a weight-average molecular weight of 300,000 or higher, or a mixture of such resins.

The inorganic powder may be, for example, of silicon oxide, titanium oxide, calcium silicate, aluminum oxide, calcium carbonate, kaolin clay, talc, diatomaceous earth or glass fibers, or a mixture thereof.

The mineral oil may principally be paraffin oil, though any other oil can also be used.

The surface active agent used as an auxiliary material for the separator may be, for example, an anionic or nonionic surface active agent which is insoluble in an extracting solvent, and in addition to the surface active agent, it is possible to use as another auxiliary material a novolak or resol type phenolic or epoxy type oxidation inhibitor which is insoluble in the extracting solvent.

The porous membrane forming the separator for a lead-acid battery according to the invention may be made from, for example, a raw material composed of a polyolefin resin, an inorganic powder and a mineral oil as its principal material and a surface active agent, etc. as its auxiliary material, 100 parts of the raw material containing 0.5 part or less of the surface active agent. The control of the amount of the surface active agent in the raw material for the porous membrane to be 0.5 part or less makes it possible to form such a porous membrane that the amount of any reducing substance liberated or eluted in diluted sulfuric acid in an electrolytic cell incorporating the porous membrane as the separator may be 1.0 ml when calculated from the consumption of a (1/100)N potassium permanganate solution per 100 cm$^2$. The amount of the surface active agent in the raw material is preferably controlled in view of the amounts of the polyolefin resin, inorganic powder and mineral oil as the principal materials, the amount of the mineral oil removed after the formation of an extruded sheet, the basic thickness of the porous membrane, etc.

A specific method of forming such a porous membrane is, for example, as described below. The principal materials consisting of 9.5 to 30 parts of polyolefin resin, 19.5 to 30 parts of inorganic powder and 49.5 to 70 parts of mineral oil and the auxiliary materials consisting of a surface active agent, etc. are mixed together under stirring to prepare a total of 100 parts of raw material. The surface active agent is so employed as to occupy 0.5 part or less in 100 parts of raw material. The mixture is melted and extruded to form an extruded sheet containing the mineral oil. Then, the mineral oil is so removed from the extruded sheet by using an organic solvent that a desired amount of the mineral oil may remain in the extruded sheet. A porous membrane having a desired thickness is formed.

The surface active agent does not necessarily have to be included in the raw material for the porous membrane, but may alternatively be applied to the extruded sheet after the mineral oil has been removed therefrom.

Even when the surface active agent is applied to the extruded sheet after the mineral oil has been removed therefrom, it is possible to produce a separator ensuring a predetermined capacity for the battery after its initial charging and prolonging its life in a high-temperature atmosphere if the porous membrane is so formed that the amount of any reducing substance originating from the surface active agent liberated or eluted in the diluted sulfuric acid in an electrolytic cell incorporating the porous membrane as the separator may be 1.0 ml or less per 100 cm$^2$ when calculated from the consumption of a (1/100)N potassium permanganate solution per 100 cm$^2$ of the porous membrane.

EXAMPLES

Examples of the invention will now be described in detail with Comparative Examples, though the invention is not limited to these Examples.

Example 1

Eleven parts of a polyethylene resin having a weight-average molecular weight of 1,500,000 to 2,000,000, 28 parts of silica powder having a specific surface area of 200 m²/g, 60 parts of a mineral oil and 0.2 part of sodium dialkylsulfosuccinate as a surface active agent were measured out and mixed together under stirring by a Henschell mixer. The mixture was melted and extruded by a twin-screw extruder to form an extruded sheet containing the mineral oil. After the mineral oil had been removed from the extruded sheet by using an organic solvent compatible with the mineral oil, but incompatible with the polyethylene resin (for example, n-hexane), a solution containing 3% of mineral oil in an organic solvent was caused to adhere to the sheet in an amount five times the weight of the base material and the sheet was dried at 50° C. to yield a separator composed of a porous membrane containing 13% of mineral oil and having a backweb thickness of 0.20 mm. When the separator was formed, the amount of the surface active agent which it contained was so controlled that the amount of any reducing substance contained in the diluted sulfuric acid in an electrolytic cell incorporating the separator might be 0.4 ml per 100 cm² when calculated from the consumption of a (1/100)N potassium permanganate solution per 100 cm² of the porous membrane.

Example 2

Eleven parts of a polyethylene resin having a weight-average molecular weight of 1,500,000 to 2,000,000, 28 parts of silica powder having a specific surface area of 200 m²/g, 60 parts of a mineral oil and 0.35 part of sodium dialkylsulfosuccinate as a surface active agent were measured out and mixed together under stirring by a Henschell mixer. Their mixture was used to form by otherwise repeating Example 1 a separator composed of a porous membrane containing 13% of mineral oil and having a backweb thickness of 0.20 mm. When the separator was formed, the amount of the surface active agent which it contained was so controlled that the amount of any reducing substance contained in the diluted sulfuric acid in an electrolytic cell incorporating the separator might be 0.7 ml per 100 cm² when calculated from the consumption of a (1/100)N potassium permanganate solution per 100 cm² of the porous membrane.

Example 3

Eleven parts of a polyethylene resin having a weight-average molecular weight of 1,500,000 to 2,000,000, 27 parts of silica powder having a specific surface area of 200 m²/g, 60 parts of a mineral oil and 0.44 part of sodium dialkylsulfosuccinate as a surface active agent were measured out and mixed together under stirring by a Henschell mixer. Their mixture was used to form by otherwise repeating Example 1 a separator composed of a porous membrane containing 13% of mineral oil and having a backweb thickness of 0.20 mm. When the separator was formed, the amount of the surface active agent which it contained was so controlled that the amount of any reducing substance contained in the diluted sulfuric acid in an electrolytic cell incorporating the separator might be 0.9 ml per 100 cm² when calculated from the consumption of a (1/100)N potassium permanganate solution per 100 cm² of the porous membrane.

Comparative Example 1

Eleven parts of a polyethylene resin having a weight-average molecular weight of 1,500,000 to 2,000,000, 27 parts of silica powder having a specific surface area of 200 m²/g, 60 parts of a mineral oil and 0.9 part of sodium dialkylsulfosuccinate as a surface active agent in an amount larger than in Examples 1 to 3 were measured out and mixed together under stirring by a Henschell mixer. Their mixture was used to form by otherwise repeating Example 1 a separator composed of a porous membrane containing 13% of mineral oil and having a backweb thickness of 0.20 mm. When the separator was formed, the amount of the surface active agent which it contained was so controlled that the amount of any reducing substance contained in the diluted sulfuric acid in an electrolytic cell incorporating the separator might be 1.8 ml per 100 cm² when calculated from the consumption of a (1/100)N potassium permanganate solution per 100 cm² of the porous membrane.

Comparative Example 2

Fifteen parts of a polyethylene resin having a weight-average molecular weight of 1,500,000 to 2,000,000, 26 parts of silica powder having a specific surface area of 200 m²/g, 58 parts of a mineral oil and 1.1 parts of sodium dialkylsulfosuccinate as a surface active agent in an amount larger than in Examples 1 to 3 were measured out and mixed together under stirring by a Henschell mixer. Their mixture was used to form by otherwise repeating Example 1 a separator composed of a porous membrane containing 13% of mineral oil and having a backweb thickness of 0.20 mm. When the separator was formed, the amount of the surface active agent which it contained was so controlled that the amount of any reducing substance contained in the diluted sulfuric acid in an electrolytic cell incorporating the separator might be 2.2 ml per 100 cm² when calculated from the consumption of a (1/100)N potassium permanganate solution per 100 cm² of the porous membrane.

Each of the separators according to Examples 1 to 3 and Comparative Examples 1 and 2 had its ohmic resistance measured and was employed to form an electrolytic cell and the each electrolytic cell was employed to test the amount of any reducing substance in the diluted sulfuric acid as calculated from the consumption of a (1/100)N potassium permanganate solution per 100 cm² of the porous membrane.

The test methods will now be described and the results will be shown in Table 1.

Ohmic Resistance:

The ohmic resistance of each separator was measured after 24 hours of immersion in diluted sulfuric acid by using test equipment conforming to SBA S0402 8.4.2.

Amount of the Reducing Substance as Calculated from the Consumption of (1/100)N Potassium Permanganate:

The determination of the amount of the reducing substance in the separatoras calculated from the consumption of (1/100)N potassium permanganate was carried out by two steps, or the step of conducting electrolysis in an electrolytic cell composed of the separator, a positive electrode, a negative electrode and diluted sulfuric acid for eluting from the separator the organic acid as a reducing substance originating from the surface active agent and the step of determining the consumption of (1/100)N potassium permanganate by titration.

The step of eluting the reducing substance from the separator by electrolytic method will first be described with reference to the drawings. Referring to FIG. 1, two positive electrode plates 2 of pure lead each measuring 9.5 mm high, 9.5 cm wide and 0.2 cm thick and three negative electrode plates 3 of pure lead equal in size to the positive electrode plates were stacked alternately and were so held together by two plastic (vinyl chloride) frames 6 placed at a pair of opposite edges, respectively, of the plates as to have a plate spacing of 5 mm, as specified by old JIS C2310. Each plastic frame 6 had a plurality of holes 6a through which the plastic frame 6 could be connected to each positive or negative electrode plate 2 or 3 from outside, and a single positive electrode post 4 projecting upwardly of one of the plastic frames 6 along its outer surface was connected to the two positive electrode plates 2 inwardly of the plastic frame 6 through its holes 6a. Likewise, a single negative electrode post 5 projecting upwardly of the other plastic frame 6 along its outer surface was connected to the three negative electrode plates 3 inwardly of the plastic frame through its holes 6a, whereby an electrolytic plate group 1 was formed.

Figure 2:
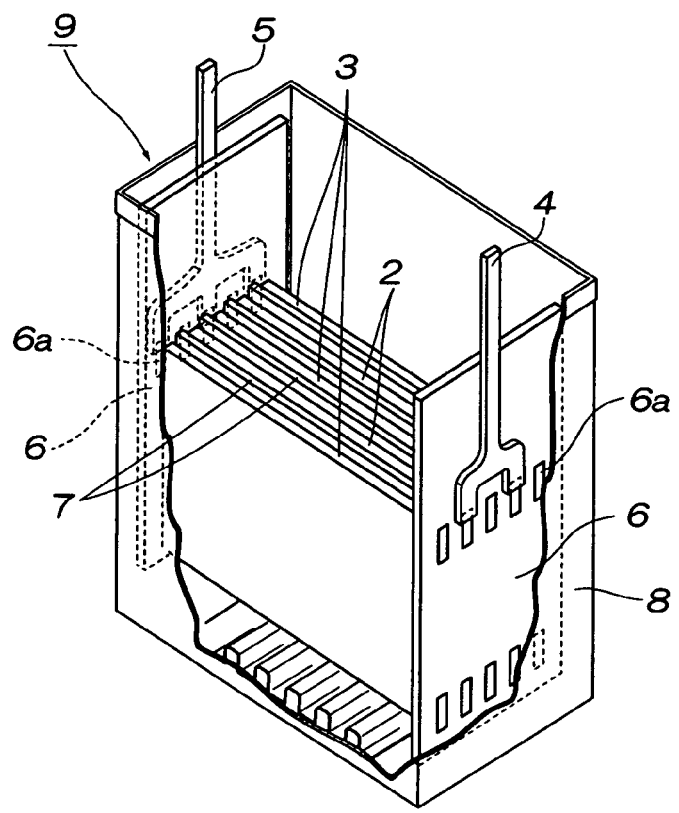
FIG. 2 is a diagram showing as installed in a cell container the electrolytic plate group shown in FIG. 1 for the determination of the amount of any reducing substance according to the invention.

Four test pieces cut from each separator 7 and measuring 10 cm high and 10 cm wide were held between every adjoining plates in the electrolytic plate group 1, and the electrolytic plate group 1 was placed in a cell container 8 having a capacity of one liter to form an electrolytic cell 9 as shown in FIG. 2, and 500 ml of diluted sulfuric acid having a specific gravity of 1.20 was filled into the cell container 8.

Figure 3:
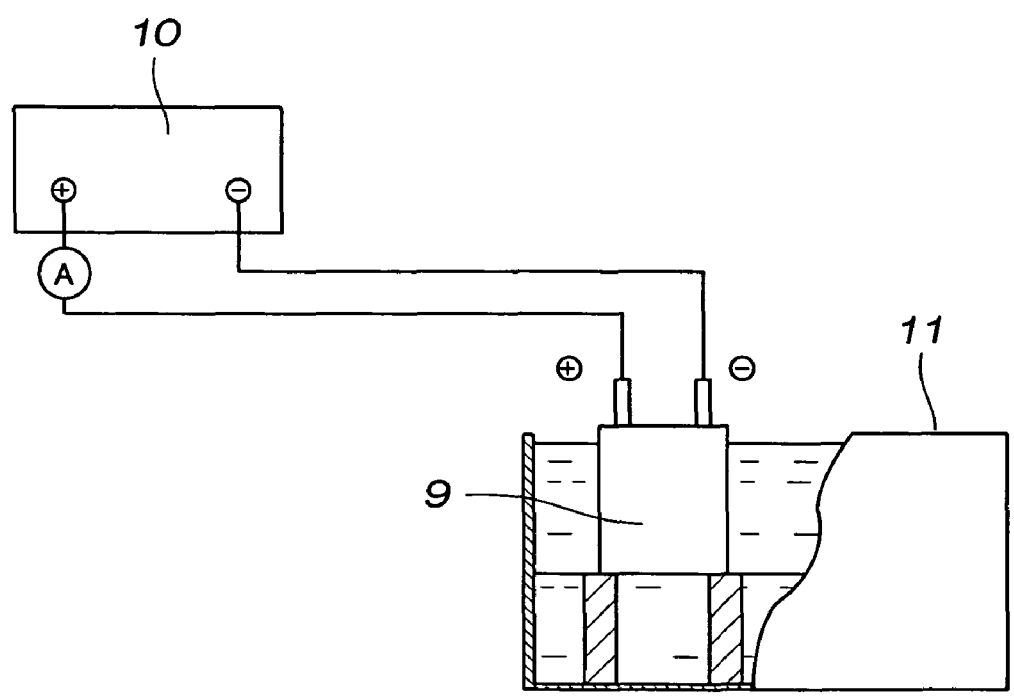
FIG. 3 is a diagram showing a direct current supplied to the cell container shown in FIG. 2 for the determination of the amount of any reducing substance according to the invention.

Then, the electrolytic cell 9 was placed in a constant-temperature water tank 11 and a constant-current DC power source 10 was connected to the positive and negative electrode posts 4 and 5, as shown in FIG. 3, and electrolysis was carried out by supplying a direct current of 1.2 A for 24 hours continuously, while holding the whole tank at 25±2° C. After electrolysis, the test-piece separators 7 were taken out and the rest was left to stand for 12 hours to have any floating lead particles settle in the electrolyte and its supernatant was collected as a test solution.

Description will now be made of a method of determining the amount of any reducing substance in the test solution by calculation from the consumption of (1/100)N potassium permanganate.

The amount of any reducing substance contained in the test solution, which was the diluted sulfuric acid electrolyte, was determined by measuring it as the consumption of (1/100)N potassium permanganate and calculating therefrom its consumption per separator measuring 10 cm high and 10 cm wide in accordance with "Potassium Permanganate Reducing Organic Matter (O)" as described in JIS K1306 (Refined Sulfuric Acid Test Method), Section 2.14. The point of time at which the test solution presented the light red purple color of potassium permanganate was adopted as the ending point of potassium permanganate titration.

Five test batteries were prepared as described below by using each of the separators according to Examples 1 to 3 and Comparative Examples 1 and 2 and each test battery was tested for its capacity after its initial charging and for the standard deviation of its capacity and also for its life cycle by a light-load life test at 75° C., while each welded cell joint was thereafter examined for corrosion. The results are shown in Table 1.

Preparation of Test Batteries:

The plates employed were the paste type positive and negative electrode plates which had been produced by an established method (corresponding to 46B24L as specified in JIS D5301-1999).

Six positive electrode plates and seven negative electrode plates were stacked alternately, while the separators according to each of Examples 1 to 3 and Comparative Examples 1 and 2 were gear sealed at their edges and wrapped about the positive electrode plates, and the plates were welded together to form a plate group.

The plate group was placed in a cell container of polypropylene, polar posts were welded to the plates of the plate group and a cover was joined to the container under heat and pressure.

The container was filled with diluted sulfuric acid forming the electrolyte and was placed in a water tank having a constant temperature of 40° C. for 18 hours of formation with an electrical charge equal to 350% of the theoretical capacity of the formed active material of the positive electrodes, whereby five initially charged test batteries were prepared by using each separator.

Battery Capacity:

Each battery was tested for its 5-hour rate capacity after its auxiliary charge in accordance with the JIS D5301, Section 8.3.2, Capacity Test and its average and standard deviation were calculated.

Light-Load Life Test at 75° C.:

Each test battery was sunk in a water tank set at 75° C. and tested under the test conditions as specified by JIS D5301-1999, 8.3.5(b).

For the accelerated evaluation of each battery for its life in a high-temperature atmosphere, however, its test was started from the lower level line and liquid replenishment was performed once a week to maintain the lower level line.

TABLE 1

| Division | PE resin, wt % | Silica powder, wt % | Mineral oil, wt % | Backweb thickness, mm | Ohmic resistance, $\Omega \cdot 100$ cm$^2$/sheet | (1/100)N KMnO$_4$ consumption, ml/100 cm$^2$ | Battery capacity after formation, Ah | Battery capacity standard deviation | Light-load life cycle at 75° C. | Corrosion of welded cell portion as tested |
|---|---|---|---|---|---|---|---|---|---|---|
| Example 1 | 24.5 | 60.7 | 13 | 0.20 | 0.0019 | 0.4 | 43.5 | 1.0 | 3360 | No |
| Example 2 | 24.6 | 60.4 | 13 | 0.20 | 0.0017 | 0.7 | 43.5 | 1.1 | 3360 | No |
| Example 3 | 24.3 | 60.4 | 13 | 0.20 | 0.0016 | 0.9 | 43.0 | 1.1 | 2880 | No |
| Comparative Example 1 | 24.2 | 59.5 | 13 | 0.20 | 0.0008 | 1.8 | 40.0 | 2.0 | 1440 | Yes |
| Comparative Example 2 | 29.7 | 53.7 | 13 | 0.20 | 0.0008 | 2.2 | 39.3 | 2.3 | 1300 | Yes |

Table 1 Teaches the Following:

Each of the test batteries including the separators according to Examples 1 to 3 so formed that the amount of any reducing substance might be 1.0 ml or less per 100 cm$^2$ when calculated from the consumption of (1/100)N potassium permanganate per 100 cm$^2$ of the porous membrane could realize a higher capacity in its initially charged state (after formation state) than those including the separators according to Comparative Examples 1 and 2. When the amount of any reducing substance was 0.7 ml or less per 100 cm² as calculated from the consumption of (1/100)N potassium permanganate per 100 cm² of the porous membrane as in Examples 1 and 2, a still further improvement could be achieved in the capacity of any battery as initially charged, and when the amount of any reducing substance was 0.5 ml or less per 100 cm² as calculated from the consumption of (1/100)N potassium permanganate per 100 cm² of the porous membrane as in Example 1, a still further improvement could be achieved in the capacity of the battery as initially charged and good results could be obtained from the test batteries without showing any variation in their capacity as initially charged.

The light-load life test at 75° C. according to JIS D5301-1999, 8.3.2(b) and modified by starting with the lowest liquid surface level ascertained a drastic improvement in the life at a high temperature of any of the test batteries including the separators according to Examples 1 to 3 so formed that the amount of any reducing substance might be 1.0 ml or less per 100 cm² when calculated from the consumption of (1/100)N potassium permanganate per 100 cm² of the porous membrane. No interstitial corrosion was found at the cell joints in any of the test batteries.

The presence of only 0.5 part or less of the surface active agent in 100 parts of the raw material for the porous membrane forming the separator as in Examples 1 to 3 made it possible to form such a porous membrane that the amount of any reducing substance liberated or eluted in the diluted sulfuric acid in any test battery including the porous membrane as its separator might be 1.0 ml or less per 100 cm² when calculated from the consumption of (1/100)N potassium permanganate per 100 cm² of the porous membrane.

On the other hand, the test revealed interstitial corrosion in the welded surfaces of the cell joints in the test batteries including the separators according to Comparative Examples 1 and 2 so formed that the amount of any reducing substance might be over 1.6 ml per 100 cm² when calculated from the consumption of (1/100)N potassium permanganate per 100 cm² of the porous membrane. The corrosion was presumably due to an organic acid formed from the reducing substance by oxidation, forming dew on the cell joints exposed from the electrolyte and thereby making lead easy to dissolve.

The test batteries including the separators according to Examples 1 to 3 did not have any interstitial corrosion in the cell joints, but showed a drastically improved life at a high temperature owing to the amount of the reducing substance which was 1.0 ml or less per 100 cm² when calculated from the consumption of (1/100)N potassium permanganate per 100 cm² of the porous membrane.

The separator for a lead-acid battery according to the invention has a very high industrial value, since it shows a predetermined capacity reliably in its initially charged state and has a prolonged life in a high-temperature atmosphere, as stated above.

INDUSTRIAL APPLICABILITY

The invention makes it possible to achieve a reliable battery capacity by preventing any reducing substance from hindering the activation (oxidation-reduction reactions) of the positive and negative electrodes during the initial charging (formation) of the battery by forming a separator for a lead-acid battery from a porous membrane so that the amount of any reducing substance liberated or eluted in diluted sulfuric acid as a result of 24 hours of electrolysis conducted at about 25° C. with a direct current of 1.2 A may be estimated by titration with a (1/100)N potassium permanganate solution and may be 1.0 ml or less per 100 cm² when calculated from the consumption of the (1/100)N potassium permanganate solution per 100 cm² of the porous membrane. It also makes it possible to restrain any corrosion of the welded surfaces of the cell joints by any volatile organic acid originating from a reducing substance and realize a prolonged battery life even in a high-temperature atmosphere.

The invention claimed is:

1. A separator for a lead-acid battery comprising a porous membrane made from a polyolefin resin, an inorganic powder and a mineral oil and containing a surface active agent,
   wherein the separator liberates or elutes 1.0 ml or less per 100 cm² of reducing substance, as calculated from a consumption of a 0.01 N potassium permanganate solution per 100 cm² of the porous membrane, when four test pieces of the separator each having a height of 10 cm and a width of 10 cm are subjected to 24 hours of electrolysis carried out at about 25° C. with a direct current of 1.2 A by using an electrolytic cell composed of the porous membrane, a positive electrode, a negative electrode and diluted sulfuric acid.

2. A separator for a lead-acid battery according to claim 1, wherein the separator liberates or elutes 0.9 ml or less per 100 cm² of reducing substance, as calculated from the consumption of a 0.01 N potassium permanganate solution per 100 cm² of the porous membrane.

3. A separator for a lead-acid battery according to claim 1, wherein the separator liberates or elutes 0.7 ml or less per 100 cm² of reducing substance, as calculated from the consumption of a 0.01 N potassium permanganate solution per 100 cm² of the porous membrane.

4. A separator for a lead-acid battery according to claim 1, wherein the polyolefin resin is a polyethylene resin.

5. A separator for a lead-acid battery according to claim 1, wherein the surface active agent is an anionic surface active agent or a nonionic surface active agent.

6. A separator for a lead-acid battery according to claim 1, wherein the surface active agent is a sodium dialkylsulfosuccinate.

7. A separator for a lead-acid battery according to claim 1, composed of the porous membrane formed from an extruded sheet containing the mineral oil from which the mineral oil is removed so that a desired amount of the mineral oil remains after forming the extruded sheet which is melted and extruded from the mixture of a total of 100 parts of raw materials provided by mixing materials containing 0.5 part or less of the surface active agent which comprises a sodium dialkylsulfosuccinate and materials consisting of 9.5 to 30 parts of the polyolefin resin, 19.5 to 30 parts of the inorganic powder and 49.5 to 70 parts of the mineral oil.

* * * * *